(12) United States Patent
Brady

(10) Patent No.: US 7,458,201 B2
(45) Date of Patent: *Dec. 2, 2008

(54) PROPULSION DEVICE WITH ENCLOSED PLENUM

(76) Inventor: Joseph Brady, 34221 S. Wilhoit Rd., Molalla, OR (US) 97038

(\*) Notice: Subject to any disclaimer, the term of this patent is extended or adjusted under 35 U.S.C. 154(b) by 29 days.

This patent is subject to a terminal disclaimer.

(21) Appl. No.: 11/614,067

(22) Filed: Dec. 20, 2006

(65) Prior Publication Data

US 2007/0095048 A1  May 3, 2007

Related U.S. Application Data

(63) Continuation of application No. 11/143,244, filed on Jun. 2, 2005, now Pat. No. 7,165,388.

(60) Provisional application No. 60/583,650, filed on Jun. 28, 2004.

(51) Int. Cl.
*F02K 9/66* (2006.01)
(52) U.S. Cl. .................................................... 60/200.1
(58) Field of Classification Search ................. 60/200.1; 165/108
See application file for complete search history.

(56) References Cited

U.S. PATENT DOCUMENTS

| | | | | |
|---|---|---|---|---|
| 2,071,624 | A | * | 2/1937 | Graham ...................... 165/108 |
| 2,511,875 | A | | 6/1950 | Protzeller |
| 2,654,583 | A | | 10/1953 | Treanor |
| 3,302,024 | A | * | 1/1967 | Edling et al. ................ 310/305 |
| 3,401,745 | A | | 9/1968 | Pato et al. |
| 4,770,063 | A | * | 9/1988 | Mundo ....................... 74/84 S |
| 4,859,158 | A | | 8/1989 | Weinbrecht |
| 5,616,973 | A | | 4/1997 | Khazanov et al. |
| 7,165,388 | B2 | * | 1/2007 | Brady ........................ 60/200.1 |

\* cited by examiner

*Primary Examiner*—Ted Kim
(74) *Attorney, Agent, or Firm*—Vista IP Law Group LLP

(57) ABSTRACT

A propulsion device contains a working mass within an enclosed plenum, where the working mass is recirculated through the plenum to produce a net force vector. The working mass is accelerated around a first bend or change in direction within the plenum by a working mass driver. The temperature of the working mass is then reduced and the working mass is slowed. The working mass is then accelerated around a second bend or change in direction within the plenum resulting in two opposing force vectors. When combined, the two opposing force vectors produce a net force, and thus, acceleration of the propulsion device. The propulsion device may be used in connection with a space vehicle or satellite.

20 Claims, 9 Drawing Sheets

Section 4A - 4A

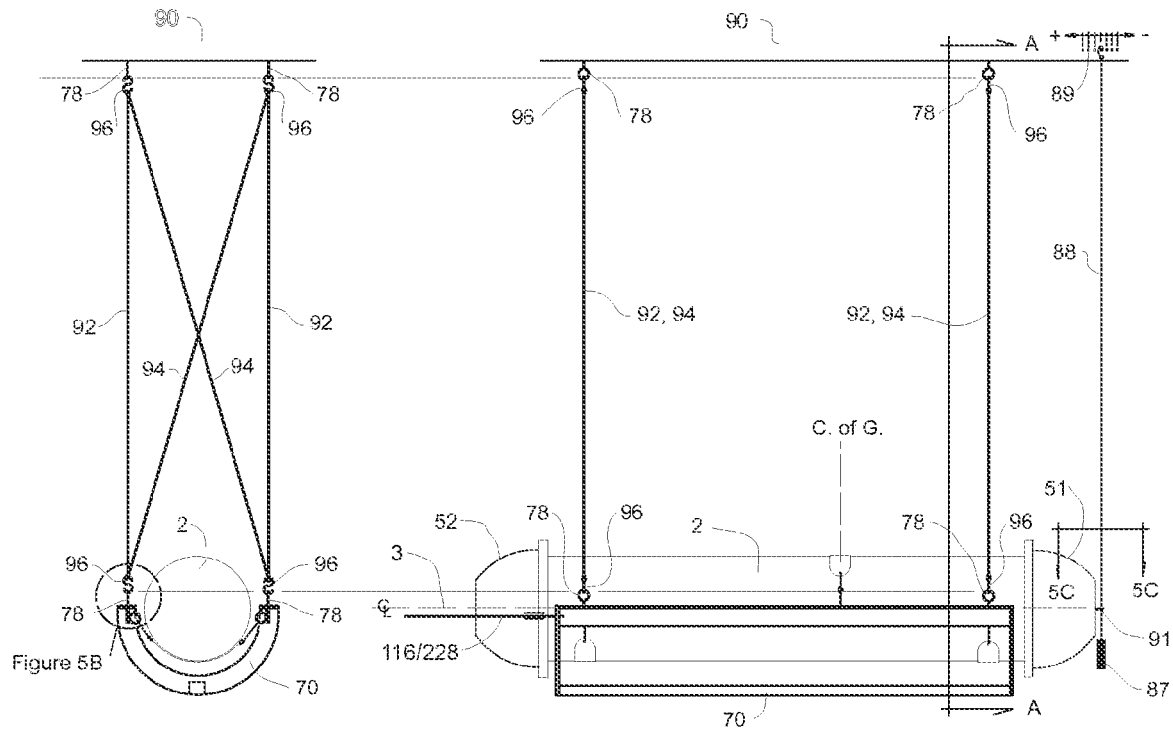
FIG. 5A
Section 5A - 5A
FIG. 5
Elevation
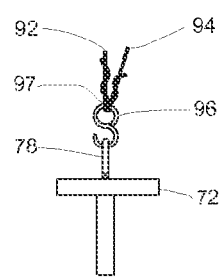
FIG. 5B
Detail - Upper 4 Similar
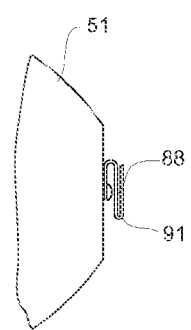
FIG. 5C
Section 5C - 5C

PROPULSION DEVICE WITH ENCLOSED PLENUM

REFERENCE TO RELATED APPLICATIONS

This Application is a continuation of U.S. patent application Ser. No. 11/143,244, filed Jun. 2, 2005, now issued as U.S. Pat. No. 7,165,388, which itself claims priority to U.S. Provisional Patent Application No. 60/583,650 filed on Jun. 28, 2004. The '244 and '650 Patent Applications are incorporated by reference as if set forth fully herein. Priority is claimed pursuant to 35 U.S.C. §§ 119 and 120.

FIELD OF THE INVENTION

This invention relates to a propulsion device that generates a net propulsive force by circulating a working mass through an enclosed plenum.

BACKGROUND OF THE INVENTION

Methods of accelerating a body typically involve contact between the body to be accelerated and an external body, or the discharge of reaction mass from the body to be accelerated. For example, an automobile is accelerated by applying motive power from the engine to drive wheels in contact with a paved or unpaved surface. Friction between the wheels and the surface allow the rotation of the wheels to produce substantially linear acceleration of the vehicle. Thus, the vehicle is put in motion by a force applied against an external mass. As another example, a rocket engine, ion engine, or other engine typically used to propel a satellite or other spacecraft discharges mass (reaction mass) during operation. Such mass may be fuel, combustion products, electrons, ions, or any other type of mass. A portion of the accelerating mass is itself accelerated in a direction opposite the desired direction of motion and discarded, resulting in a reaction force acting on the satellite or other spacecraft.

Because propulsion devices consume and/or discharge mass in order to produce acceleration, the ability of a propulsion device to accelerate a body at a particular rate is constrained by the amount of mass available for consumption or discharge. For example, the station-keeping function of a satellite is often performed with small rocket motors utilizing a fuel such as hydrazine. When the fuel for those station-keeping motors is exhausted, the satellite may drift out of control, ending its useful life even though the components of the satellite, such as the electrical power source, may have significant useful life remaining. Thus, the amount of fuel available for use by a propulsion device may have a direct impact on the useful life of a satellite, vehicle, or other body utilizing that propulsive device.

Further, the amount of fuel or reaction mass available for use by a propulsive device can limit the maximum velocity that can be attained by a body. For example, a spacecraft utilizing an ion propulsion system can accelerate substantially continuously to a final velocity that is attained when the supply of ions utilized for thrust is exhausted. At that point, the spacecraft continues to travel at the final velocity. Thus, the maximum velocity of a spacecraft is limited by the amount of fuel or reaction mass that the spacecraft can carry.

SUMMARY OF THE INVENTION

The present invention generally relates to a propulsion device that contains a working mass within an enclosed plenum, where circulation of the working mass through the plenum produces a net propulsive thrust force resulting in an acceleration of the device.

In one aspect of the invention, a propulsive device includes a substantially sealed plenum within which a working mass circulates. The working mass may be in a gaseous state. The plenum may be defined between two nested shells or housings (or other enclosures). This plenum may be formed from several sections, each having an entrance and an exit. The propulsion device may have first and second ends, with each end of the device having a bend or change in direction of the plenum contained therein.

During operation of the device, the working mass begins its circulation through the plenum at or near a first end of the plenum. The working mass is accelerated through a first turn or bend in the plenum. Moving away from the first end, the working mass then passes through a section of the plenum where heat energy is removed from the working mass by radiation, convection, or conduction processes. The working mass continues onward to the second end. At the second end, the working mass enters a second turn or bend in the plenum whereby the working mass is returned to the first end via a return duct, thus forming a continuous, sealed plenum allowing no substantial loss of the working mass during the operation of the propulsion device. In this way, the supply of working mass is retained within the propulsive device, such that the duration of the operation of the propulsion device and its maximum velocity are not dependent on the quantity of working mass in or the expulsion of working mass from the propulsion device.

In another aspect of the invention, the working mass is accelerated by a working mass driver such as, for example, an impeller device at the end of the return duct prior to the first end of the plenum, which imparts kinetic energy to the working mass. In this way, energy from outside the plenum is imparted to the working mass. The impelling force compresses the working mass, causing the temperature and pressure of a unit of working mass to rise. The kinetic energy of the working mass may be expressed as the sum of the velocity and momentum of the individual molecules or atoms of the working mass. Such kinetic energy of the working mass is conserved within the working mass through essentially elastic collisions between the molecules, but may be lost to the working mass through conduction, radiation, or convection processes involving a surface such as the plenum wall.

In another aspect of the invention, after being accelerated the working mass is forced to change its direction of travel by the shape of the plenum in such a way that an acceleration is imparted to the working mass which is them imparted to the plenum housing or shell and any mass attached thereto. The magnitude of this first force of acceleration is a function of the mass of the redirected working mass, the velocity of the redirected working mass, and the radius and angle of the redirection of the working mass.

In another aspect of the invention, the working mass travels from the section of the plenum redirecting the working mass (e.g., a first turn or bend) and which results in the first force into a section of the plenum where the plenum wall is maintained at a lower temperature than that of the working mass by means such as radiation and/or conduction away from the plenum to a heat sink such as outer space. The kinetic energy of the individual molecules or atoms of the working mass interacting with the plenum wall is reduced as expressed by a reduction in the velocity of these individual molecules or atoms of the working mass. This loss of kinetic energy is then communicated throughout the volume of the working mass by an elastic collision process. The mass of these individual molecules or atoms of the working mass remain unchanged, but their velocity is individually and collectively reduced which results in the increase of the density of the working mass as it is cooled in this section of the plenum.

In another aspect of the invention, the flow of the working mass throughout the plenum is continuous. As a consequence, the number of molecules or atoms of working mass passing any given reference plane normal to the direction of flow of the working mass in one unit of time is everywhere the same throughout the length of the plenum. This is true no matter what the shape, size, or direction of the plenum, and no matter what the pressure, temperature, volume, or velocity of the working mass. If it were otherwise, either there would be a loss of working mass from the plenum, or the movement of the working mass would be interrupted. Therefore, within the plenum, the mass of the working mass is conserved over time.

In another aspect of the invention, the velocity of the working mass at any reference plane through the reference plane normal to the direction of flow of the working mass is a function of the area of the plenum at the reference plane and the volume of the working mass passing through that plenum area in a unit of time. The volume of the working mass may be changed by manipulating the pressure and/or temperature of the working mass if it is in a gaseous state. The volume of the working mass may be reduced by reducing the temperature of the working mass in that section of the plenum where the plenum wall is maintained at a lower temperature than that of the working mass. In such a manner the velocity of the working mass is reduced as the working mass passes through this section of the plenum and the kinetic energy of individual molecules or atoms of the working mass is transferred first to the plenum wall, and then to an external heat sink. Such energy lost to the working mass and to the plenum is not recoverable as an increase in kinetic energy by the working mass by an expansion of the working mass or other process.

In another aspect of the invention, the section of the plenum where the plenum wall is maintained at a temperature lower than that of the working mass is followed by a second section of the plenum (e.g., second turn or bend) where the working mass is forced to change its direction of travel by the shape of the plenum in such a way that a deceleration is imparted to the working mass which is then imparted to the plenum and any mass attached thereto. The magnitude of this second force being a function of the mass of the redirected working mass, the velocity of the redirected working mass, and the radius and angle of the redirection of the working mass.

In another aspect of the invention, the angle of redirection of the working mass in the sections of the plenum where the working mass is forced to change its direction of travel sums to 360 degrees in the plane of the forces generated from the redirection of the working mass.

In another aspect of the invention, the velocity of the working mass in the first turn or bend of the plenum where the working mass is forced to change direction and which results in the first force of acceleration is higher than the velocity of the working mass in the second section of the plenum where the working mass is forced to change direction and which results in the second force of deceleration. Since the first and second forces are the result of the centripetal acceleration of these masses which is a product of the mass times the velocity squared divided by the radius of the turn or bend, and since the flow of mass of working mass per unit time is everywhere the same throughout the plenum, and since the velocity of the working mass is greater in the section of the plenum that creates the first force of acceleration than the velocity in the section of the plenum that creates the second force of deceleration, a net acceleration of the plenum housing or shell, the working mass, and all mass attached to the plenum housing or shell results for as long as power is provided to the working mass driver (e.g., impeller or other motive device) and heat is removed from the working mass.

In another aspect of the invention, a section of the plenum connects the exit of the second turn or bend of the plenum to the entrance of the first turn or bend. The plenum thus forms a sealed duct and a continuous path for the flow of the working mass.

BRIEF DESCRIPTION OF THE DRAWINGS

FIG. 5 is an elevation of the test cradle suspension.

FIG. 5A is a sectional view of the test cradle suspension taken along the line A-A in FIG. 5.

FIG. 5B is a detail of the test cradle suspension.

FIG. 5C is a detail of the Calibration Device taken along the line 5C-5C in FIG. 5.

DETAILED DESCRIPTION OF THE PREFERRED EMBODIMENTS

Figure 1A:
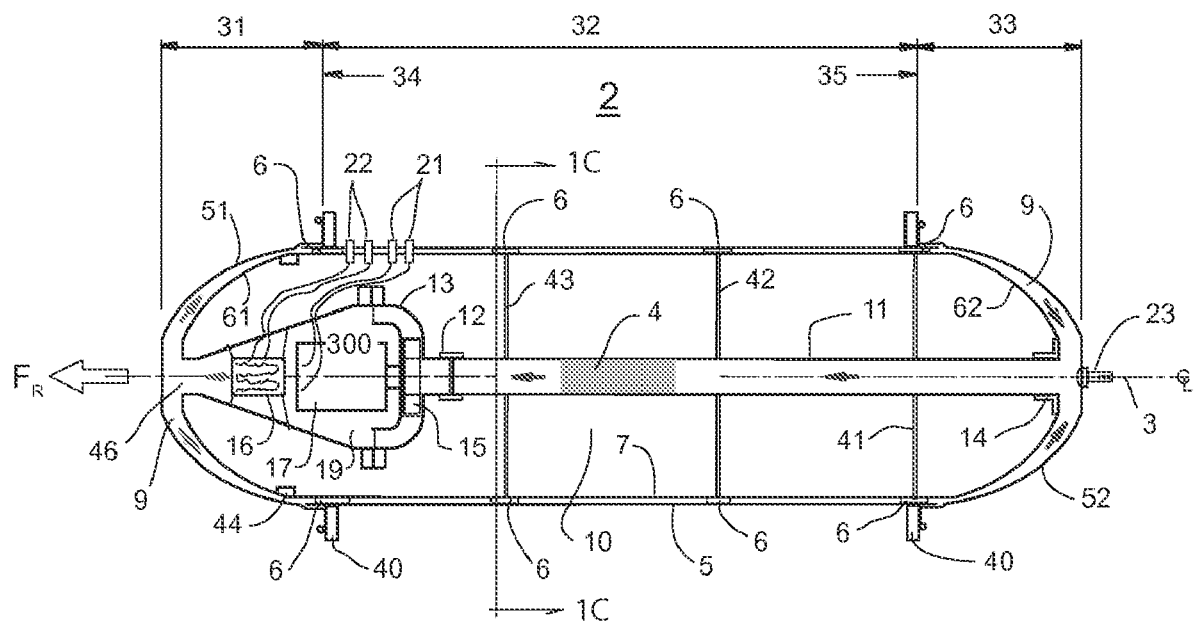
FIG. 1A is a schematic representation of one embodiment of the propulsive device.

Referring to FIG. 1A, a cross-section of an embodiment of a propulsive device 2 is shown. In one embodiment, the propulsion device 2 includes an outer shell 5 or housing and an inner shell 7 or housing, forming a plenum 9 between the outer shell 5 and the inner shell 7. A working mass 4 is contained in the plenum 9 formed between the outer shell 5 and the inner shell 7. The outer shell 5 is sealed to substantially prevent the transfer of a working mass 4 across the outer shell 5 between the plenum 9 and the external environment outside the outer shell 5. Similarly, the inner shell 7 is sealed to substantially prevent the transfer of a working mass 4 across the inner shell 7 between the plenum 9 and the interior space 10 on the other side of the interior shell 7. In this way, the plenum 9 itself is sealed, and working mass 4 is substantially contained within the plenum 9. Sealing the outer shell 5 and the inner shell 7 may be performed with any sealant, weld, structure, or technique, as long as the resultant plenum 9 is substantially sealed against mass transfer into or out of the plenum 9.

Still referring to FIG. 1A, in one aspect of the invention, the propulsion device 2 has a driver section 31 (e.g., an impeller section in one aspect of the invention), a heat exchanger section 32, and a return section 33. In one embodiment, the driver section 31 and the return section 33 are both constructed of stainless steel with a substantially smooth finish on both the inner and outer surfaces of both the outer shell 5 and the inner shell 7. However, other materials may be used to construct the outer shell 5 and the inner shell 7 if so desired. Further, the finish on the outer surface of the outer shell 5 and the inner surface of the inner shell 7 is not critical to the invention. The inner surface of the outer shell 5 or the outer surface of the inner shell 7 may have rougher or smoother finishes in order to provide desired flow characteristics within the plenum 9.

In one embodiment, the outer shell 5 of both the driver section 31 and the return end 33 may be formed from a substantially hemispheric bowl shape having a flattened end. In the illustrative embodiment shown in FIG. 1A, the inner shell 7 of both the driver section 31 and the return end 33 were formed from identical bowl shapes of the same form and curvature. When partially nested together, the inner shell 5 bowl is inset along the major axis 3 of the propulsion device 2 and the outer shell 7 bowl forms an annular duct between the inner shell 5 and the outer shell 7 that is substantially the same at both the driver section 31 and the return end 33. The outer shell 5 and the inner shell 7 are not limited to these shapes, and may be shaped in any manner consistent with the operation of the propulsion device 2 as described below. For example, the outer shell 5 might have a different geometry (e.g., curvature) than that of the inner shell 7.

In one embodiment, the heat exchanger section 32 is substantially cylindrical having an outer shell 5 and an inner shell 7. The shells 5, 7 may each be constructed of sheet aluminum in the form of a tube. The outer shell 5 forms a tube somewhat larger in inner diameter than the outer diameter of the inner shell 7 tube, thereby forming an annular duct between the inner shell 7 and the outer shell 5 as part of the plenum 9. The outer shell 5 and the inner shell 7 are not limited to these shapes, and may be shaped in any manner consistent with the operation of the propulsive device as described below. For example, the heat exchanger section 32 might have an oval cross section, or some other form instead of the circular cross section described above.

In one aspect of the invention, the direction of the net thrust vector produced in the propulsion device 2 may be altered or controllable in relationship to the center of mass of any attached mass such as a spacecraft by diverting the attached mass away from the centerline 3 of the propulsion device. In another aspect of the invention, the direction of the net thrust vector produced in the propulsion device 2 may be altered or controllable by diverting the flow of the working mass 4 so that it now flows asymmetrically within the propulsive device 2 (e.g. not at an equal velocity when measured at multiple points of a transverse section of the plenum taken at right angle to the centerline of the propulsive device). In another aspect of the invention, the net force produced by the propulsion device 2 may be controllable (e.g., increased or decreased). This may be accomplished, for example, by modifying the flow rate of the working mass 4 within the plenum 9. This may be accomplished by control of a working mass driver 300 (discussed in detail below). Alternatively, the net force produced by the propulsion device 2 may be controllable by altering the temperature reduction in the working mass 4 in the heat exchanger 32 portion of the device 2 by limiting the rate of heat transfer away from the heat exchanger 32 with insulation or other means. For example, a cooling system located within device 2 may be employed to control the rate of heat transfer within the heat exchanger 32 portion of the device 2. Alternatively, the net force produced by the propulsion device 2 may be controllable by increasing or decreasing the amount of supplementary heating of the working mass 4 by means of a heating device 16 located between impeller 15 and the entrance to the impeller end turn 46.

Figure 1B:
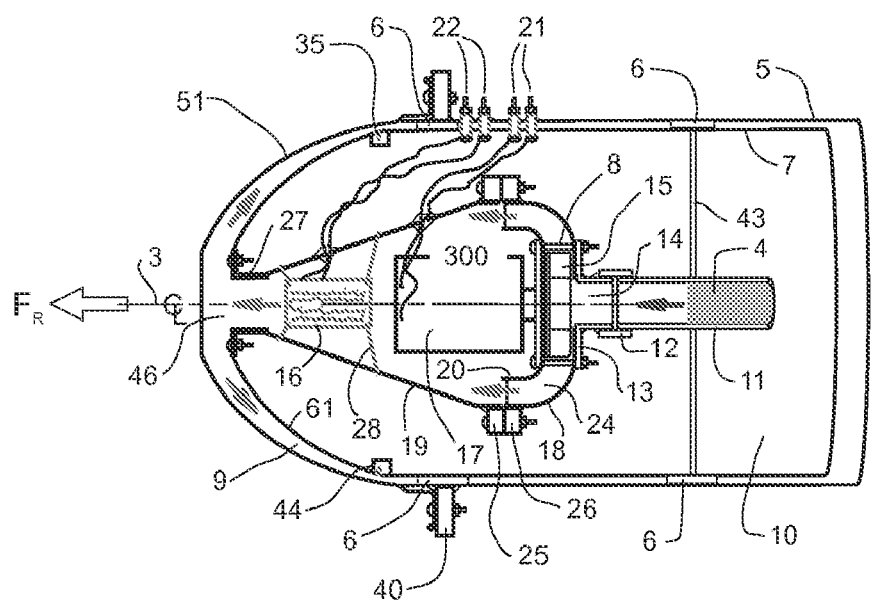
FIG. 1B is detail of the impeller assembly of the propulsion device shown in FIG. 1A.
Figure 1C:
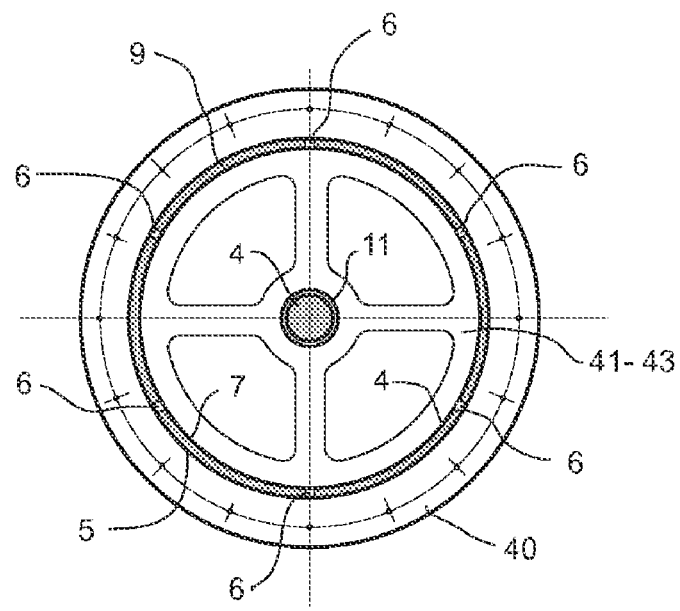
FIG. 1C is a cross section of the propulsion device taken along the line 1C-1C in FIG. 1A.

Referring now to FIGS. 1A, 1B and 1C, a test propulsion device 2 is shown. It should be understood that the apparatus and method described herein is not limited to the specific test propulsion device 2 described below. The test device 2 was used to demonstrate and/or confirm the fact that a re-circulating working mass 4 passing through a specially designed plenum 9 is able to impart a net force to the device 2. Specific embodiments or implementations may be used beyond the specific test device 2 described below.

The test device 2 includes two substantially identical stainless steel bowls 51, 52 each having an inner diameter of 11 inches at their widest point with a lip extending outward at their point of maximum width were used to form the outer shell portions of the driver section 31 and the return end 33. Another two bowls 61, 62 substantially identical to bowls 51, 52 were cut down to a maximum diameter of 9.75 inches with the lip removed to form the inner shell portions of the impeller and return ends. When the inner bowl 61 is placed within the outer bowl 51 and displaced by 0.5 inches along their common axis (the major axis 3 of the test device 2), an annular duct of decreasing area is formed between them.

As shown in FIG. 1A, a return duct 11 was formed by a PVC pipe having an internal diameter of 1.5 inches to which is glued the three 0.125 inch thick, 9.72 inch diameter fiberboard formers 41, 42, 43. The return duct was supported by a removable steel pipe for this and subsequent construction procedures. The inner heat exchanger duct wall was formed to 9.75 inches in outer diameter from 0.016 inch thick T6 aluminum forty-seven inches long and the meeting edges were overlapped and epoxied. This duct was wrapped tightly with twine before the epoxy cured to ensure a close fit on the formers 41, 42, 43, and similar former 44 not glued to the return duct. After the epoxy was completely cured, the twine was removed.

Twenty-four two inch long spacers 6 (FIGS. 1B, 1C) having a 0.125×0.125 inch cross section were glued to the outer surface of this inner duct wall in four rows of six spacers arranged equally at the 60 degree points radially. In a similar fashion, the outer heat exchanger duct wall was formed to 10.0 inches inner diameter from 0.016 inch thick T6 aluminum forty-six inches long and the meeting edges were overlapped and epoxied. This duct was wrapped with twine before the epoxy cured to ensure a close fit over the spacers on the outer surface of the inner duct. After the epoxy cured the twine was removed and both ends of the inner duct wall were cut along the major axis of the duct to form 0.375×0.375 inch tabs around the entire circumference of both ends of the inner duct wall. These tabs were then bent toward the inside of the duct approximately 20 degrees to mate with the inner surface of the inner end bowls 61, 62 of the driver section and return ends 31, 33.

One end of the return duct 11 was epoxied and sealed into a 1.875 inch diameter hole centered in the bottom of the return end inner bowl 62 with flange 13, and the outer rim of the inner end bowl 62 bowl was epoxied and sealed to the matching tabs on the inner heat exchanger duct wall 7. Referring to FIG. 1B, one embodiment of mass driver 300, in the form of an impeller assembly 30, was constructed which houses the impeller motor 17, impeller 15, and supplemental heater 16 and contains the flow of the working mass as an extension of return duct 11. Mass driver 300 is not limited to this method, and may be constructed using another method or means to impart kinetic energy to the working mass 4. For example, mass driver 300 might utilize acoustic or magnetohydrodynamic means to impart kinetic energy to working mass 4.

A 1.875" diameter hole 14 was cut centered in the base of the impeller outer bowl 18 (Farberware 3 qt.) centered on central axis 3. Flow straightening vanes 24 were epoxied to the inner surface of impeller outer bowl 18, and an impeller outer bowl flange 26 was cut from 0.5' thick birch plywood and epoxied to the rim of the impeller outer bowl 18. A 3.75" diameter hole was cut in the base of an impeller inner bowl 20 (Farberware 2 qt.) centered on central axis 3. An impeller 15 and motor 17 were obtained from a hand-held portable vacuum cleaner (Dirt Devil model M08100REDC) and mounted centered on the central axis 3 inside impeller housing 19 formed by impeller outer bowl 18 and impeller inner bowl 20 with the impeller in the plenum space formed between the two nested bowls 18, 20 by spacers 8. Eight flow straightening vanes 24 were formed of 0.007" aluminum sheet and epoxied equally spaced and radially disposed around center axis 3 to the inner surface of outer bowl 18. Four 1.25 inch long #6 bolts extend through the motor mount, through the impeller inner bowl 20, through 0.5 inch spacers 8, through the impeller outer bowl 18, and through return duct flange 13 to which is epoxied return duct coupling 12 for the impeller end of the return duct. The 7.375 inch diameter end of a 9.5 inch long conical section motor cover formed of 0.007" aluminum sheet was epoxied to cover flange 25 formed of 0.5' thick birch plywood, and the other end of the cover was epoxied to a section of 1.5" i.d. ABS tubing with attached flange 27 all centered on central axis 3. A supplemental heater 16 was positioned centered in the motor cover 19 along the center axis 3 by suspension wires 28. The return duct flange 13, impeller outer bowl 18, impeller inner bowl 20, spacers 8, impeller 15, impeller motor 17, supplemental heater 16, and tubing with attached flange 27 were then assembled to impeller inner end bowl 61, to thereby form a mass driver 300. Where necessary, a silicone sealant was applied to substantially seal the plenum 9 space from the interior space 10 of the device. Two impeller motor power feed throughs 21 for the motor power connections and two supplemental heater power feed throughs 22 were installed through the outer and inner shells 5, 7 and were epoxied so as to be substantially sealed.

The tabbed end of the impeller end of the inner duct 7 and the impeller end of the outer duct 5 were coated with silicone sealant which was allowed to cure. Mass driver 300 (in the form of an impeller assembly) was inserted into the impeller end of interior space 10 of the heat exchanger section 32, and return duct coupling 12 was fitted onto return duct 11 such that it formed a substantially sealed connection. The impeller end inner bowl 61 was then centered on the inner duct 7 and attached with eight impeller assembly screws 35 to the impeller end former 44.

The impeller end outer bowl 51 was then carefully placed on the heat exchanger and spaced 0.5 inches from impeller inner bowl 61 measured along the central axis 3 forming part of plenum 9. The plane of the lip of the outer impeller end bowl was marked on the outer heat exchanger duct wall. Two flanges 40 each 13 inches in diameter with 10.03 inch diameter holes concentric with the outer diameter were cut from 0.5 inch birch plywood. The impeller outer bowl 51 and return end outer bowl 52 had previously been drilled with sixteen each 0.125 inch diameter holes equally spaced around the lip of the bowl (parallel to the center axis of the bowl). Each flange 40 was mated to one outer bowl and sixteen matching 0.125 inch diameter holes were drilled in the flange. The flanges were sealed with Varathane, and epoxied to the outer heat exchanger duct wall as marked.

The outer surface of the end of the outer shell 5 of the return end of the heat exchanger 32 was coated with silicone sealant which was allowed to cure. The return end outer bowl 52 was then carefully placed on the heat exchanger 32 and spaced 0.5 inches from impeller inner bowl 62 measured along the central axis forming part of plenum 9. The plane of the lip of the outer impeller end bowl 51 was marked on the outer heat exchanger shell 7. The second plywood flange was then epoxied to the outer surface of the heat exchanger duct wall as marked. After the epoxy cured, the return end outer bowl 52 was then sealed with silicone sealant and bolted to the flange with sixteen each #6 bolts.

After twenty-four hours, the entire volume (81 liters) of the test propulsion device 2 was pressurized with room air to 0.2 psi above the ambient atmospheric pressure. It was determined that any leakage from the internal volume of the test apparatus to the external atmosphere was less than 0.02 cc per second in a twenty-four hour test.

Referring back to FIG. 1A, a return duct 11 connects one portion of plenum 9 to another. In one embodiment, the return duct 11 is essentially cylindrical, and substantially coaxial with the centerline 3 of the propulsion device 2. The return duct 11 may connect a first end of the inner shell 7 to a second end of the inner shell 7. Other configurations of the return duct 11 may be utilized, if desired. The return duct 11 may be formed as an integral part of the inner shell 7, or may be a separate part that is connected to the inner shell 7. In one embodiment, the interface between the return duct 11 and the inner shell 7 is sealed to substantially prevent the transfer of working mass 4 across the interface between the return duct 11 and the inner shell 7. However, working mass 4 may be allowed to enter an interior space 10 within the inner shell 7 as long as that working mass 4 does not escape the propulsion device 2. If the working mass 4 is allowed to enter the interior space 10, the plenum 9 is still said to be sealed.

In the test propulsion device 2, the return duct 11 is a length of PVC pipe having a 1.5 inch internal diameter. A hole is provided in both the first end and the second end of the inner shell 7. At the first end containing the impeller 15, a coupling 12 epoxied to a flange 13 bolted to the impeller assembly centered in the end of inner bowl 51 is provided to allow the disassembly of the test apparatus. The interface between the inner bowl 61 and the flange 27 (See FIG. 1B) is sealed with silicone sealant, and by compression. The first end of return duct 11 is a tight slip fit into coupling 12. At the second end, a PVC flange 14 is epoxied to the inner surface of inner bowl 62 concentric with a 1.875 inch hole centered in the end of inner bowl 62, and the second end of return duct 11 was then epoxied into the flange 14 and slightly protruding through the hole into inner bowl 62 in order to facilitate sealing this end of return duct 11. In one embodiment, the interior space 10 within the inner shell 7 and outside the return duct 11 is substantially empty. However, the interior space 10 may be used for other purposes, such as providing space for sensors, actuators, controls, thermal management devices or other devices that may be useful in the operation of propulsion device 2. As one example, the inner shell 7 may be adapted to have a movable surface such that the shape of inner shell 7 at one or more locations can be controlled as desired. If so, the interior space 10 may include mechanisms and/or controls for such reshaping of the inner shell 7. In another example, the interior space 10 may be adapted for the storage of supplemental working mass, or the transportation of cargo or personnel.

In one embodiment, an impeller 15 is positioned at the first end of the return duct 11, within the plenum 9. This location is in the mass driver 300 (e.g., impeller assembly) inside inner shell 7, between impeller end inner bowl 61 and former 43. However, the impeller 15 may be positioned at another location along the return duct 11, if desired. In one embodiment, the impeller 15 is substantially circular, and is connected to an impeller driver 17 via a shaft (not shown) or other linkage, wherein the impeller driver 17 rotates the impeller 15. Such rotation imparts kinetic energy to the working mass 4 and impels it through the plenum 9, as described in greater detail below. In one embodiment, a rotary impeller 15 is positioned substantially coaxial with the centerline 3 of the propulsion device 2.

While reference is made to an impeller 15 and impeller driver 17 it should be understood that any working mass driver 300 capable of imparting motion to a working mass 4 may be used. For example, the working mass driver 300 may be a magnetohydrodynamic device, an acoustic device, or other device adapted to drive the working mass 4 through the plenum 9. When an impeller 15 is employed, the impeller driver 17 may be any device capable of driving impeller 15. For example, the impeller driver 17 may be a heat engine, an electric motor, a flywheel, or other device. As another example, where the working mass driver 300 is a magnetohydrodynamic device or an acoustic device, the driver 17 may be a power supply connected to a power source such as a solar array, or battery. In such configurations of impeller 15 and impeller driver 17, the linkage between them may be any mechanism, structure, or the like by which the impeller driver 17 conveys energy to the impeller 15 for introduction into the working mass.

In one embodiment, the impeller driver 17 is adapted to drive the impeller 15 at a selected one of a range of speeds. In this way, the impeller driver 17 can drive the impeller 15 at a selected speed to impart a selected amount of energy to the working mass 4 of the plenum 9. More generally, the impeller driver 17 may be adapted to drive the impeller 15 through a range of operations (e.g. speed), where that range may be defined by a maximum amount of energy imparted to the working mass 4 and a minimum amount of energy imparted to the working mass 4. The impeller driver 17 may be connected to an internal or external controller (not shown) adapted to select a particular speed for the impeller driver 17 to drive the impeller 15.

In one embodiment, impeller driver 17 is located within plenum 9 such that it is cooled by the working mass 4 flowing through the plenum 9. In this embodiment, the impeller driver 17 and the working mass 4 are chosen to be compatible with one another, such that the working mass 4 does not substantially interfere with the operation of the impeller driver 17 and vice versa. If the working mass 4 is allowed to enter the space within the mass driver 300 from the plenum 9, the plenum 9 is still said to be sealed. That is, the sealed plenum 9 may allow working mass 4 to communicate with the space within the mass driver 300. In another embodiment, if a sufficient seal exists between the impeller 15 and the impeller driver 17 to substantially prevent the leakage of working mass 4 through the interface between the impeller 15 and the impeller driver 17, the impeller driver 17 may be located externally to the space within plenum 9.

In one embodiment, contacts 21 are provided on the outer shell 5, and electrically connected to impeller driver 17. The contacts 21 are utilized to provide electrical power to impeller driver 17. If the impeller driver 17 is located external to the outer shell 5, then the contacts 21 may be placed directly on the impeller driver 17. Other structures or mechanisms than contacts 21 may be used to provide electrical power to the impeller driver 17. Further, if the impeller driver 17 is a heat engine, or operates from a form of power or energy other than electrical, the contacts 21 may be omitted. In such an embodiment, other mechanisms or structures may be used to convey energy to the impeller driver 17.

In an embodiment in which the impeller driver 17 is a heat engine, any method or structure of providing the appropriate heat to the impeller driver 17 may be used. For example, visible or infrared light may be focused on at least a portion of the impeller driver 17 with lenses, mirrors, or the like. As another example, a heat conductor may be placed in contact with the impeller driver 17, where external heat is applied to the heat conductor and transferred to the impeller driver 17. As another example, piping arranged as a heat exchanger may be provided around the impeller driver 17, through which hot gas or liquid is pumped to provide heat to the impeller driver 17. As another example, a nuclear reactor or radioisotope heat source may be employed as a heat source either directly or indirectly to heat the working mass 4.

In another embodiment, a supplemental heat source 16 may be employed to raise the temperature of the working mass 4. This heat source is located between the discharge of the impeller 17 and the entrance of the impeller end turn such that the working mass 4 so heated is then compelled to make a 180 degree turn in the plane containing central axis 3. In one embodiment, contacts 22 are provided on the outer shell 5, and electrically connected to supplemental heater 16. The contacts 22 are utilized to provide electrical power to supplemental heater 16. Other structures or mechanisms than contacts 22 may be used to provide electrical power to the supplemental heater 16. Further, if supplemental heater 16 operates from a form of power or energy other than electrical, the contacts 22 may be omitted. In such an embodiment, other mechanisms or structures may be used to convey energy to the supplemental heater 16.

In an embodiment in which the supplemental heater 16 is a heat exchanger, any method or structure of providing the appropriate heat to the supplemental heater 16 may be used. For example, visible or infrared light may be focused on at least a portion of the supplemental heater 16 with lenses, mirrors, or the like. As another example, a heat conductor may be placed in contact with the supplemental heater 16, where external heat is applied to the heat conductor and transferred to the supplemental heater 16. As another example, piping through which hot gas or liquid is pumped may provide heat to the supplemental heater 16. As another example, a nuclear reactor or radioisotope heat source may be employed as a heat source either directly or indirectly to heat supplemental heater 16.

A port 23 may be provided in the return end outer bowl 52, or at another point in the outer shell 5 for the plenum 9, if desired. The port 23 allows for the introduction of working mass 4 into, and/or the bleed of working mass 4 from, the propulsion device 2. In one embodiment, the port 23 is a valve. In the embodiment of the test propulsion device 2, the port 23 is a standard tire stem valve, onto which a hand pump or other pump can be detachably connected in order to add or remove working mass 4 (in this test room air) to the apparatus. In another embodiment, some other gaseous working mass 4 such as an inert gas (xenon, for example) may be introduced in place of the room air.

When viewed as in FIGS. 1A and 1C, the outer shell 5 and the inner shell 7 forming the plenum 9 in this embodiment may be seen to be substantially symmetrical, both in plan, in rotation about centerline 3, and in cross section at any station normal to centerline 3. The working mass 4 is impelled through the plenum 9 by a pressure gradient established by impeller 15 driven by impeller driver 17. The working mass 4 drawn through return duct 11 is compressed and heated by impeller 15, and would form a column of mass extending along center line 3 except that it is constrained by the form of outer bowl 51 and inner bowl 61 to turn through a 180 degree angle substantially parallel to center line 3 and form a moving cylinder of working mass 4. This moving working mass 4 continues in motion through the heat exchanger section 32 of plenum 9 where it the temperature of the working mass 4 is reduced so that the temperature of the working mass 4 at the exit of the heat exchanger section 32 is substantially less than the temperature of the working mass 4 at the entrance of the heat exchanger section 32. The heat thus removed from the working mass 4 is lost to the propulsion device 2 by radiation, conduction, and convection processes to the environment surrounding the propulsive device 2, and is no longer a factor in the operation of the device 2. The cooled working mass 4 is then constrained to turn through a another 180 degree turn substantially parallel to center line 3 by the form of outer bowl 52 and inner bowl 62 into the return duct 11. Thus, it may be said that the working mass 4 describes a closed loop having the form of a torus, which is substantially symmetrical about the centerline 3 of the propulsive device 2. Other forms of plenum 9 may be employed, such as a single loop, or multiple loops having one or more impeller device 15.

As was stated above, the flow of the working mass 4 throughout the plenum may be continuous, but it may be made to flow at various speeds or rates. When the working mass 4 is made to flow through the plenum 9 at a constant rate, the amount of working mass 4 which may be expressed as kilograms, or the number of molecules or atoms of working mass 4 that may pass through any reference plane placed at right angles to the flow of the working mass 4 and so arranged to completely cross one section of the plenum such as the return duct 11, the heat exchanger 32, or any other portion of plenum 9 in a chosen unit of time is everywhere the same throughout the plenum. This is true even if a certain portion of the working mass 4 may be warmer or cooler, or at a higher or lower pressure than that of another portion of the working mass. The velocity past the reference plane of the working mass 4 will then be such that an equal mass as expressed in kilograms or the number of atoms or molecules of working mass 4 will pass through the reference plane, or there must be a loss of working mass 4 to the plenum 9, or the movement (flow) of the working mass 4 must be interrupted.

If the working mass 4 were to maintain the same temperature and pressure throughout the plenum, no sustained acceleration of the propulsive device 2 would be possible. That is to say, the mass flow and the summing velocities of flow of the working mass 4 would be equal throughout the plenum 9 such that no one vector force generated by such movement would be greater than an opposing vector force generated by another such movement with a net sum zero force and no acceleration of the propulsive device 2 being the result. This is described as "Newton's Box," or the principle that no action within a frame of reference can cause that frame of reference to undergo a sustained acceleration. However, the propulsive device 2 does not operate with the working mass 4 at a constant temperature and pressure.

A Theoretical Analysis of the Propulsion Device

Figure 2:
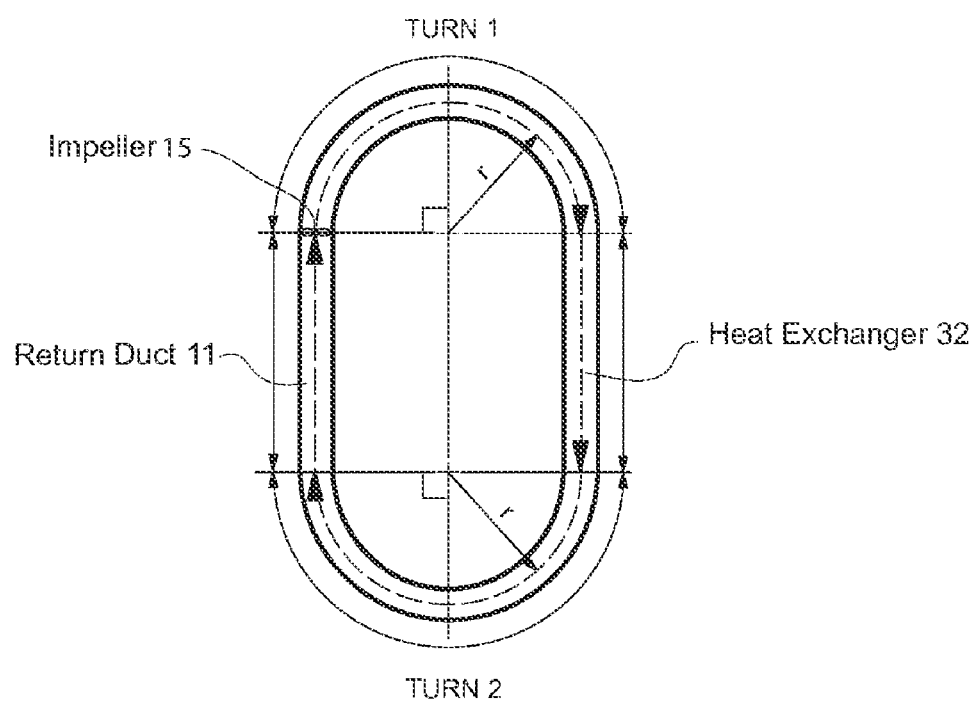
FIG. 2 is a diagram showing the schematic arrangement of the propulsion device.

While a description is given below regarding the current understanding of the theoretical basis for the propulsive device 2, it should be understood that the present invention is not limited to any particular theoretical basis. Referring now to FIG. 2, a toroidal duct is shown consisting of two 180° turns (turn 1 and turn 2) of equal constant radius (r) connected by two straight sections of equal length, all considered to have a constant cross sectional area (A) for the purpose of this analysis. One straight section is designated as a heat exchanger 32, while the other is a return duct 11 only. The ideal gas content of the 180° turn segment labeled "Turn 1" is designated as containing volume $V_1$ (m³) and mass $m_1$ (kg) having velocity $v_1$ (m/second), pressure $p_1$ (kPa), and temperature $T_1$ (° K).

The content of the section labeled "Heat Exchanger 32" is designated as containing mass $m_e$ (kg) which transits the length of this section in time $t_e$ (seconds). Heat energy removed from mass $m_e$ ($T_1$-$T_2$) in this section is considered to be lost from the duct to an external heat sink.

The 180° turn segment labeled "Turn 2", which has the same radius and cross sectional area as Turn 1, is designated as having volume $V_1$ (m³) containing mass $m_2$ (kg) having velocity $v_2$ (m/second), pressure $p_2$ (kPa), and temperature $T_2$ (° K). Note that since mass $m_1$ must pass any point along the duct in time $t_1$, the relation of mass $m_1$ to mass $m_2$, the relation of volume $V_1$ and $V_2$, and the relation of velocity $v_1$ to velocity $v_2$ will all be a function of temperatures $T_1$ and $T_2$ and pressures $p_1$ and $p_2$.

A steady state circulation from the return duct into Turn 1 is imposed upon the circulating gas by the radial impeller 15 shown at the entrance of Turn 1 in FIG. 2. The impeller 15 (or other working mass driver 300) is connected to some power source external to the duct, and is the source of the heat energy removed in the heat exchanger (although supplemental heating may be used to increase temperature $T_1$).

Figure 3:
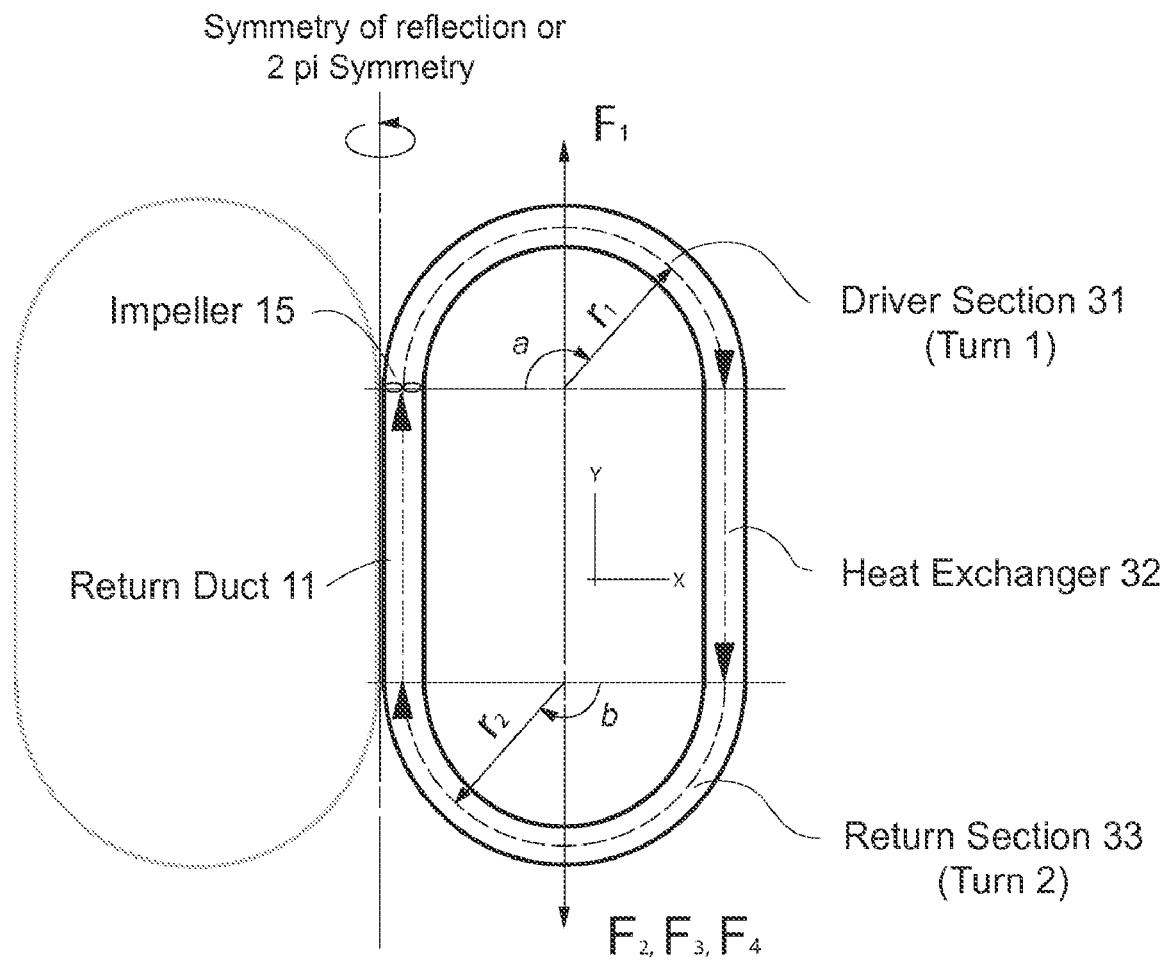
FIG. 3 is a diagram showing the forces acting upon the propulsion device.

Referring to FIG. 3, the major axis of the return duct 11 (vertical) is designated as the y-axis, with the positive direction being toward the driver section 31. The minor axis of the duct (horizontal) is designated as the x-axis, with the positive direction being toward the heat exchanger side 32. It is important to note that the duct illustrated in FIG. 3 is a partial cross section of a body having either symmetry of reflection or $2\pi$ symmetry of revolution about a vertical axis parallel to the y-axis and tangent to the return section of the duct. As a consequence, all force vector components normal to this central axis (perpendicular to the y-axis) are considered to be canceled to zero by an equal opposing force. Therefore, only force vector components aligned parallel to the y-axis must be considered in this analysis.

With reference to FIG. 3, the centripetal force $F_{C1}$ multiplied by the integral of sin a $(0, \pi)$ for Turn 1 equals the y-axis force $F_1$ (N) acting in the positive y direction as is shown by Equations 1-5 below:

$$F_{C1} = \frac{m_1 \cdot v_1^2}{r_1} \text{(centripetal force)} \quad (1)$$

$$F_1 = \frac{m_1 \cdot v_1^2}{r_1} \cdot \sum_0^\pi \sin a \quad (2)$$

$$F_1 = \frac{2 \cdot m_1 \cdot v_1^2}{r_1} \quad (3)$$

$$\text{where: } v_1 = \frac{\pi \cdot r_1}{t_1}$$

$$F_1 = \frac{2 \cdot m_1}{r_1} \cdot \frac{(\pi \cdot r_1)^2}{t_1^2} \quad (4)$$

$$F_1 = \frac{2 \cdot m_1 \cdot \pi^2 \cdot r_1}{t_1^2} \quad (5)$$

Gas exiting Turn 1 at velocity $v_1$, temperature $T_1$, and pressure $p_1$ and entering the heat exchanger section 32 is cooled to temperature $T_2$ at pressure $p_2$, and slowed to velocity $V_2$, resulting in force $F_2$ (N) that acts in the negative y direction as shown in equations 6-10 below:

$$F_2 = -\frac{m_e}{t_e} \cdot (v_1 - v_2) \tag{6}$$

where: $v_1 = \frac{V_1}{A \cdot t_1}$ and: $v_2 = \frac{V_2}{A \cdot t_1}$

For: $\frac{V_1 \cdot p_1}{T_1} = \frac{V_2 \cdot p_2}{T_2}$

Then: $V_2 = V_1 \cdot \frac{T_2 \cdot p_1}{T_1 \cdot p_2}$ and: $\frac{m_e}{t_e} = \frac{m_1}{t_1}$ (conservation of mass)

$$F_2 = -\frac{m_1}{t_1} \cdot \left( \frac{V_1}{A \cdot t_1} - V_1 \cdot \frac{T_2 \cdot p_1}{T_1 \; p_2} \cdot \frac{1}{A \cdot t_1} \right) \tag{7}$$

$$F_2 = -\frac{m_1}{t_1} \cdot \frac{V_1}{A \cdot t_1} \cdot \left( 1 - \frac{T_2 \cdot p_1}{T_1 \; p_2} \right) \tag{8}$$

and: $V_1 = \pi \cdot r_1 \cdot A$ $$F_2 = -\frac{m_1}{t_1} \cdot \frac{\pi \cdot r_1 \cdot A}{A \cdot t_1} \cdot \left( 1 - \frac{T_2 \cdot p_1}{T_1 \; p_2} \right) \tag{9}$$

$$F_2 = \frac{-m_1 \cdot \pi \cdot r_1}{t_1^2} \cdot \left( 1 - \frac{T_2 \cdot p_1}{T_1 \cdot p_2} \right) \tag{10}$$

In Turn 2, the centripetal force $F_{C2}$ multiplied by the integral of sin b $(\pi, 2\pi)$ equals the y-axis force $F_3$ (N) acting in the negative y direction as shown in equations 11-18 below:

$$F_{C2} = \frac{m_2 \cdot v_2^2}{r_2} \text{(centripetal force)} \tag{11}$$

$$F_3 = \frac{m_2 \cdot v_2^2}{r_2} \cdot \sum_\pi^{2\pi} \sin b \tag{12}$$

$$F_3 = -\frac{2 \cdot m_2 \cdot v_2^2}{r_2} \tag{13}$$

The volume of Turn 2 (not quantity $V_2$) is defined as being the same as that of Turn 1 ($r_1 = r_2$, A=constant), or $V_1$, and is defined as containing mass $m_2$. The volume of gas $V_2$ (pressure and temperature dependent) is defined as containing mass=$m_1$ therefore:

$$m_2 = m_1 + m_1 \cdot \left( \frac{V_1 - V_2}{V_2} \right) = m_1 \cdot \left( 1 + \frac{V_1 - V_2}{V_2} \right) \tag{14}$$

$$\frac{V_1 - V_2}{V_2} = \frac{V_1}{V_2} - 1 \text{ where: } V_2 = V_1 \cdot \frac{T_2 \cdot p_1}{T_1 \; p_2} \tag{15}$$

then: $\frac{V_1}{V_2} - 1 = \frac{V_1 \cdot T_1 \cdot p_2}{V_1 \cdot T_2 \cdot p_1} - 1 = \frac{T_1 \cdot p_2}{T_2 \cdot p_1} - 1$ $$m_2 = m_1 \cdot \left( 1 + \frac{T_1 \cdot p_2}{T_2 \cdot p_1} - 1 \right), \text{ therefore: } m_2 = m_1 \cdot \frac{T_1 \cdot p_2}{T_2 \cdot p_1} \tag{16}$$

and: $v_2 = \frac{V_2}{A \cdot t_1} = \frac{V_1}{A \cdot t_1} \cdot \frac{T_2 \cdot p_1}{T_1 \cdot p_2}$ $$F_3 = -2 \cdot m_1 \cdot \frac{T_1 \cdot p_2}{T_2 \cdot p_1} \cdot \frac{(V_1 \cdot T_2 \cdot p_1)^2}{(A \cdot t_1 \cdot T_1 \cdot p_2)^2} \cdot \frac{1}{r_2} \tag{17}$$

$V_1 = \pi \cdot r_1 \cdot A$ and: $r_1 = r_2$, then: $V_1 = \pi \cdot r_2 \cdot A$ -continued $$F_3 = -\frac{2 \cdot m_1 \cdot \pi^2 \cdot r_2 \cdot T_2 \cdot p_1}{t_1^2 \cdot T_1 \cdot p_2} \tag{18}$$

Note that the gas exiting Turn 2 is considered to maintain pressure $p_2$, temperature $T_2$, and velocity $V_2$ throughout the return duct back to the impeller. Consequently, the sum of the y-axis forces generated by the return duct portion of the gas flow equals zero.

The impeller section 15 serves to increase pressure $p_2$ to pressure $p_1$, and temperature $T_2$ to temperature $T_1$. This results in an increase in gas velocity from $v_2$ to $v_1$, and a y-axis force $F_4$ (N) acting in the negative y direction as shown in equations 19-21 below:

$$F_4 = -\frac{m_i \cdot (v_1 - v_2)}{t_i} \text{ Where: } \frac{m_i}{t_i} = \frac{m_1}{t_1} = \frac{m_e}{t_e} \tag{19}$$

$$F_4 = -\frac{m_e \cdot (v_1 - v_2)}{t_e} \tag{20}$$

Therefore, from the heat exchanger discussion (equations 6-10) above:

$$F_4 = -\frac{m_1 \cdot \pi \cdot r_1}{t_1^2} \cdot \left( 1 - \frac{T_2 \cdot p_1}{T_1 \cdot p_2} \right) \tag{21}$$

Summing the $F_R$ forces:

$$F_R = F_1 + F_3 + F_2 + F_4 \text{ Where } F_2 = F_4, \text{ then: } \tag{22}$$

$$F_R = \frac{2 \cdot m_1 \cdot \pi^2 \cdot r_1}{t_1^2} - \tag{23}$$

$$\frac{2 \cdot m_1 \cdot \pi^2 \cdot r_2 \cdot T_2 \cdot p_1}{t_1^2 \cdot T_1 \cdot p_2} + 2 \cdot \left( -\left( \frac{m_1 \cdot r_1}{t_1^2} \cdot \left( 1 - \frac{T_2 \cdot p_1}{T_1 \cdot p_2} \right) \right) \right)$$

Then for: $r_2 = r_1$ $$F_R = \frac{2 \cdot m_1 \cdot \pi^2 \cdot r_1}{t_1^2} - \tag{24}$$

$$\frac{2 \cdot m_1 \cdot \pi^2 \cdot r_1 \cdot T_2 \cdot p_1}{t_1^2 \cdot T_1 \cdot p_2} - \frac{2 \cdot m_1 \cdot \pi \cdot r_1}{t_1^2} \cdot \left( 1 - \frac{T_2 \cdot p_1}{T_1 \cdot p_2} \right)$$

$$F_R = \frac{2 \cdot m_1 \cdot \pi^2 \cdot r_1}{t_1^2} \cdot \left( 1 - \frac{T_2 \cdot p_1}{T_1 \cdot p_2} \right) - \frac{2 \cdot m_1 \cdot \pi \cdot r_1}{t_1^2} \cdot \left( 1 - \frac{T_2 \cdot p_1}{T_1 \cdot p_2} \right) \tag{25}$$

$$F_R = (2\pi - 2) \cdot \left( \frac{m_1 \cdot \pi \cdot r_1}{t_1^2} \right) \cdot \left( 1 - \frac{T_2 \cdot p_1}{T_1 \cdot p_2} \right) \tag{26}$$

and $\frac{\pi \cdot r_1}{t_1} = v_1$, then:

$$F_R = (2\pi - 2) \cdot \frac{m_1 \cdot v_1}{t_1} \cdot \left( 1 - \frac{T_2 \cdot p_1}{T_1 \cdot p_2} \right). \tag{27}$$

In Equation 27 it should be noted that for the condition where the term $p_1/p_2$ is greater than zero, temperature $T_1$ may be increased with supplemental heat energy as required after the impeller section and before Turn 1 such that the term $T_2/T_1$ is much less than zero. Therefore, for all $m_1$, $v_1$, and $t_1$ greater than zero, accelerative vector force $F_R$ may always be made greater than zero.

Referring back to FIG. 1A, consider that which occurs as the working mass 4 (e.g., gas) passes through the 180 degree impeller end turn 1 as constrained between outer bowl 51 and inner bowl 61, through the heat exchanger section 32, and through the 180 degree return end turn 2 as constrained between outer bowl 52 and inner bowl 62 and as illustrated in FIG. 1A. Note that at the entrance to 180 degree turn 1 the working mass 4 may be said to move radially outward to the central axis 3 of the propulsion device 2, and at the entrance to 180 degree turn 2 the working mass 4 may be said to move radially inward at a right angle to the central axis of the propulsion device 2. The centripetal acceleration of the working mass 4 as it flows through 180 degree impeller end turn 1 will be said to impose an acceleration upon the propulsive device 2 along its central axis 3 toward the end of the propulsive device 2 which houses the impeller 15 (or other working mass driver 300). The centripetal acceleration of the working mass 4 as it flows through 180 degree return end turn 2 will be said to impose a deceleration upon the propulsive device 2 along its central axis 3 away from the end of the propulsive device 2 which houses the impeller 15.

One embodiment of the propulsive device 2 as shown in FIGS. 1A, 1B and 1C and described as the test device 2 is constructed to be symmetrical about its central axis 3. Therefore, radial forces normal to that axis are canceled by substantially equal opposing forces. In addition, the test device 2 is constructed so that the effective radius of the section described above as 180 degree turn 1 is the same as that of the turn described as 180 degree turn 2. However, these turns may have different effective radii in another embodiment of the invention.

After a period of continuous operation of the test device 2 at a substantially constant rate of flow, the working mass 4 exits the impeller 15 and enters the 180 degree impeller end turn 1 at some pressure $p_1$, at some temperature $T_1$, and at some velocity $v_1$. Under these conditions, pressure $p_1$ was experimentally determined to be 100.2 kPa, temperature $T_1$ was determined to be 299.5° K, and the velocity $v_1$ to be 1.1 meters per second averaged across the 180 degree arc of turn 1. The radius of turn 1 was measured to be 0.0635 m, therefore, it may be shown that the transit time $t_1$ of the working mass 4 is 0.181 seconds. The volume $V_1$ of the 180 degree turn 1 was determined to be 640 cc. Therefore, it may be shown that this volume $V_1$ contains a mass $m_1$ of room air equal to 0.00078 kg at pressure $p_1$ and temperature $T_1$.

After passing through the heat exchanger section 32, the temperature $T_2$ of the working mass 4 was measured to be 296° K, and the pressure $p_2$ has been reduced to 100 kPa. From equation 27 above, accelerative force FR may be calculated:

$$F_R = (2\pi - 2) \cdot \frac{(0.00078 \cdot 1.1)}{0.181} \cdot \left(1 - \frac{296 \cdot 100.2}{299.5 \cdot 100}\right) \quad \text{(Equation 27)}$$

$F_R = 0.00020$ Newtons, or 0.020 gram

Referring to FIG. 3, this 0.020 gram net accelerating force is aligned with the central axis 3 of the propulsive device 2 and will accelerate this device toward the end of the device housing impeller 15 (i.e., in the direction of Force arrow $F_1$) for so long as the motion of the working mass 4 is maintained through the action of the impeller 15 and the temperature difference of $T_1$ and $T_2$ across the heat exchanger 32 maintained. This acceleration is independent of any force exerted by any other body in contact with the propulsion device 2 and requires no discharge of any mass from the propulsion device 2.

A test apparatus was constructed that permitted the determination of the presence or absence of an accelerating force while minimizing the effects of vibration, thermal expansion of the test article, and the effect of convection currents in the air surrounding the warm test article.

Figure 4:
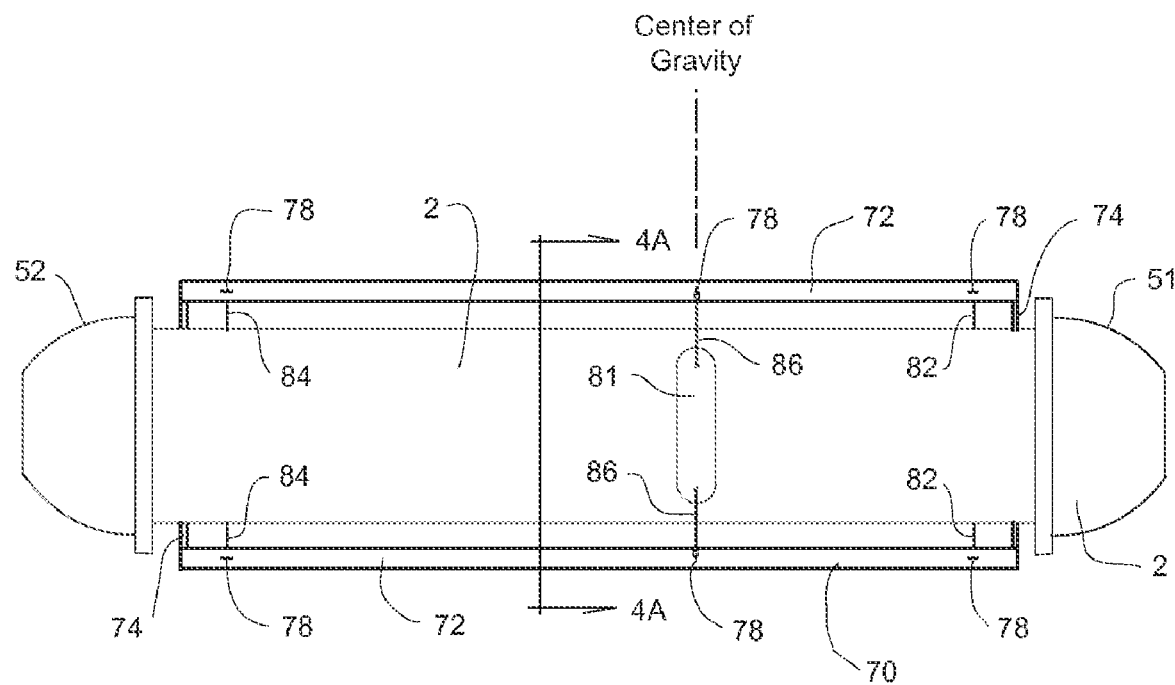
FIG. 4 is a plan view of the test cradle assembly.
Figure 4A:
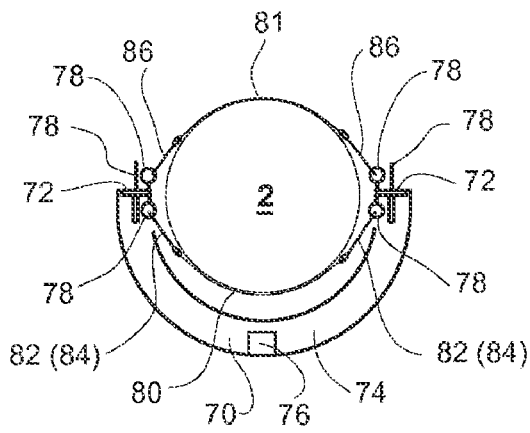
FIG. 4A is a section of the test cradle assembly taken along the line 4A-4A in FIG. 4.

Referring to FIG. 4 and section FIG. 4A, a cradle 70 was constructed to support the test device 2. Two T-shaped frame rails 72 were assembled from strips of ¼ inch plywood. Two semi-circular end formers 74 were cut from ¼ inch plywood, and a ¾×¾ inch fir spreader 76 was positioned between the end formers as shown. The cradle 70 was assembled with screws and epoxy adhesive. The test device 2 was supported in the cradle at each end by a strap 80 and two connecting links. Because the test device 2 is heavier at one end (the impeller end), and because it expands longitudinally during operation (approx. 0.1 mm), it is necessary both to accommodate this movement, and to prevent a shift of the center of gravity of the test device 2 longitudinally within the cradle. Consequently, the connecting links 82 at the impeller end of the cradle must be shorter than the connecting links 84 at the return end of the cradle so that the center of gravity of the propulsive device 2 does not move longitudinally along center axis 3 within cradle 70 during a test procedure.

Because the test device 2 reacts to the torque impulse as the impeller 15 is induced to speed up or slow down its rotation by the impeller driver 17, a torque strap 81 was epoxied to the upper surface of the test device 2 at the center of gravity (C.G.), and was connected to the cradle 70 frame rails 72 by torque links 86.

Referring to FIGS. 5, 5A and details FIGS. 5B, 5C, the cradle 70 was then suspended in an enclosed frame 90 by the single strand steel wire vertical suspension links 92 (four each), and the single strand steel wire diagonal suspension links 94 (four each). At each end a suspension link set consisting of two vertical links 92 and two diagonal links 94 was assembled as a unit on a jig in such a manner that the plane of the cradle attach points would be parallel to the plane of the enclosure suspension points after installation. An "S" hook 96 was provided at each end point, and the suspension links 92 and 94 were epoxied with epoxy 97 to the hooks 96. This arrangement effectively prevents any movement of the cradle 70 with respect to the enclosed frame 90 except longitudinally in a vertical plane coincident with the major axis 3 of the test device 2. The cradle is free to move in the defined plane subject to the restraint of only the force of gravitation and the rolling friction of the support pivot points, which is negligible.

Figure 6A:
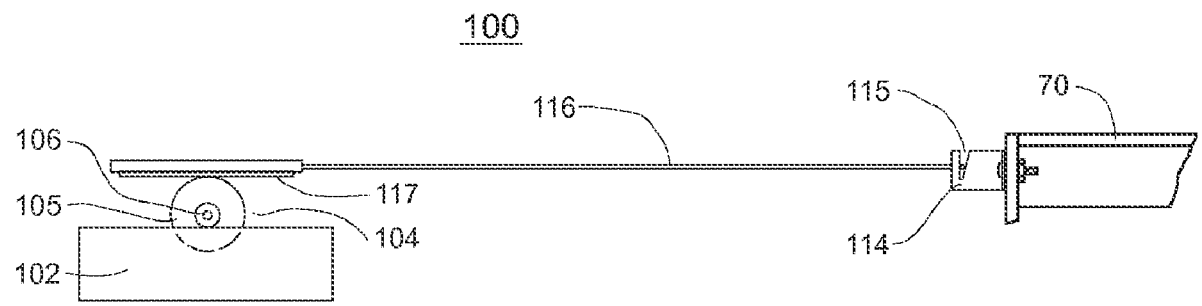
FIG. 6A is a side view of first test apparatus.
Figure 6B:
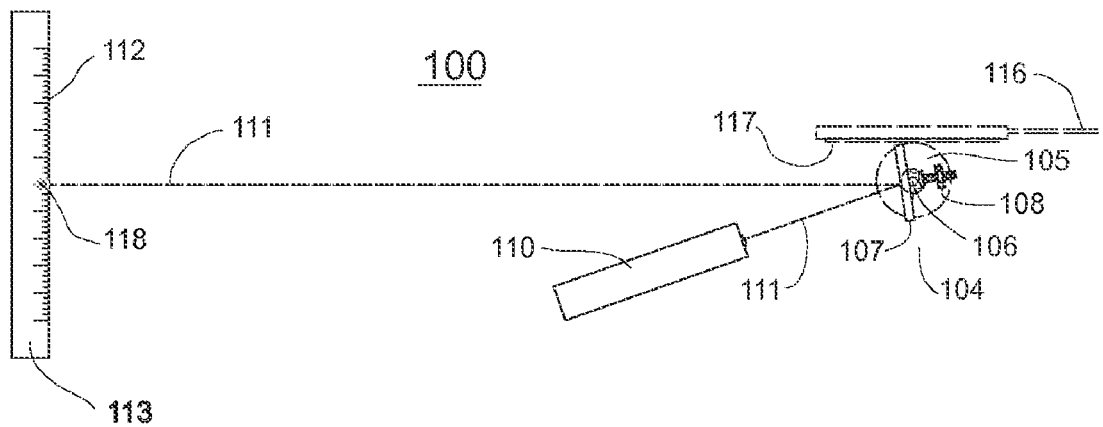
FIG. 6B is a diagram of the optics of first test apparatus.

A first test rig 100, as shown in FIGS. 6A and 6B, was designed to measure the longitudinal displacement of the cradle as induced by an accelerating force along the major axis of the test device 2. The operating principle is that of a pendulum of length L (m) having a mass M (kg) suspended in a vertical gravitational field g (m/sec²) which is acted upon at right angles to the vertical gravitational field by a force f (N) will be displaced from its rest position by some distance d (m) according to the Equation 28:

$$d = \frac{f \times L}{M \times g} \quad (28)$$

Referring to FIGS. 6A and 6B, the first test rig 100 consisted of two parallel knife edges 102 mounted with their upper edges in a common horizontal plane normal to the force of gravity. An optical assembly 104 resting on and free to roll along on the knife edges 102 consists of a pulley 105 mounted on an axle 106 to which is also epoxied a first surface mirror 107. The optical assembly 104 was balanced about its horizontal axis of rotation by the counterweight 108. A laser pointer 110 was aimed at the center of the first surface mirror 107 in such a manner that the laser beam 111 was projected back to a target 112. The target 112 is marked with a millimeter scale 113.

A bracket 114 was bolted to one corner of the cradle 70 with a pivot point 115 slotted to receive push rod 116. The other end of the push rod 116 was fitted with a high friction material in the form of a narrow strip 117 in contact with pulley 105. The position of the optical assembly 104 was adjusted such that the push rod 116 lies parallel in both the vertical and horizontal plane with the major axis 3 of the test device 2.

The geometry of the first test apparatus 100 was such that any longitudinal movement of the cradle 70 in the vertical plane results in a displacement of the laser spot 118 greater by a factor of 640 than the movement of the cradle 70. The first test apparatus 100 has the favorable characteristic of imposing no restraint on the movement of the cradle 70 other than a small amount of inertia. The first test apparatus 100 has the unfavorable characteristic of having both an analog output and relatively poor sensitivity. For example, for a test that results in an accelerating force f of 0.014 gram (0.00014 N) with a suspension length L of 1.54 M and a cradle+test device 2 mass m of 8.5 kg, equation (28) yields a displacement d of:

$$d = \frac{0.00014 \times 1.54}{8.5 \times 9.8} = 0.0000026 \text{ meters, or } 0.0026 \text{ mm}$$

This results in a displacement m of the laser spot 118 at the target scale 112 of:

$$m = 0.0026 \times 640 = 1.66 \text{ mm}$$

Figure 7:
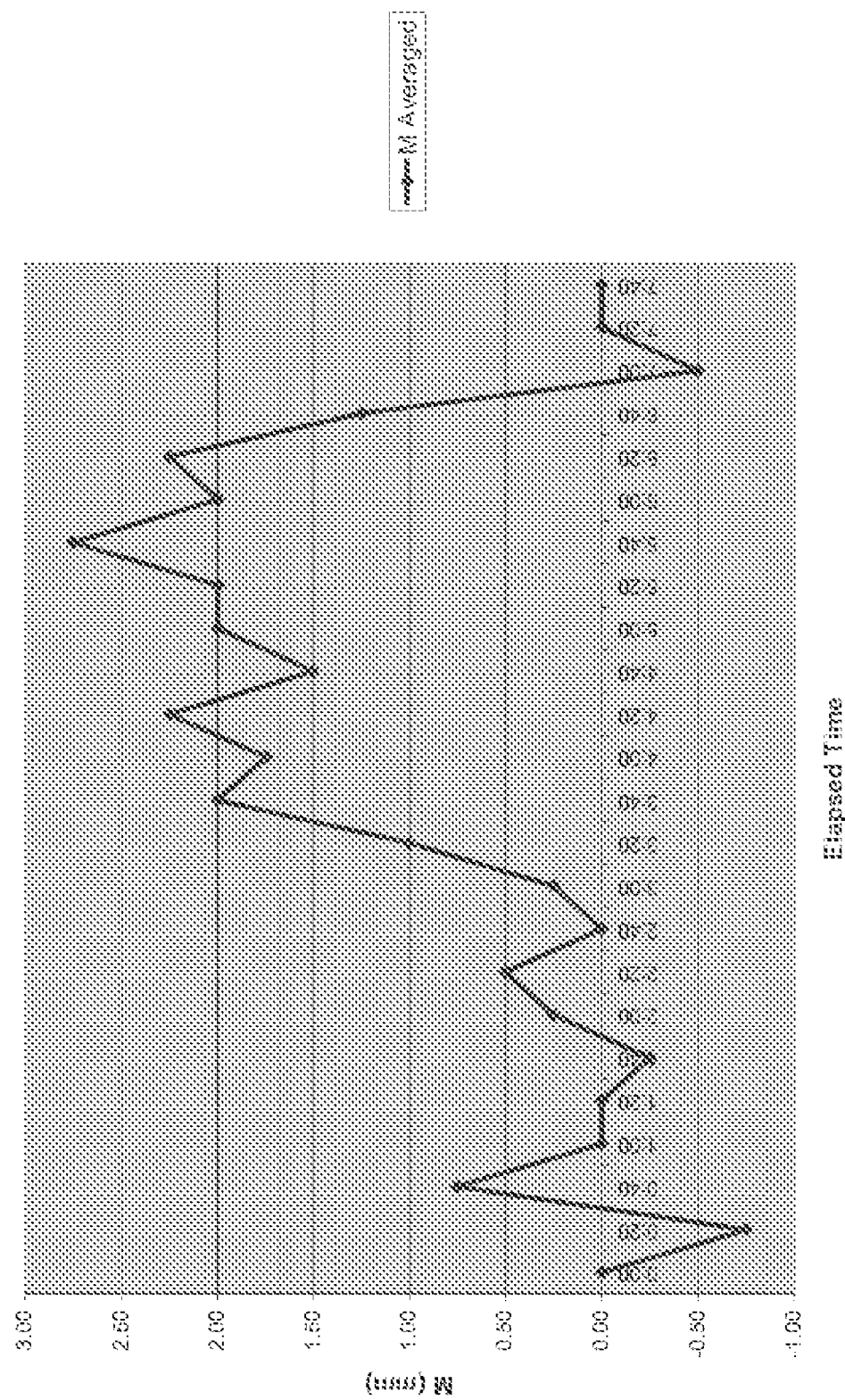
FIG. 7 is a data plot of four consecutive test runs of test apparatus.

Referring now to FIG. 7, a typical first test apparatus 100 test run is shown with power being applied at elapsed time 0:00, and ramped up to full power at 0:30. Full power is maintained to elapsed time 7:00, and then ramped down to zero at elapsed time 7:30. Data points are taken at 20 second intervals, and the displacement value (millimeters) of the laser spot 118 along target 112 as measured by scale 113 is shown as "M." The geometry of the first test apparatus was such that movement of the test device 2 toward the impeller end results in an increase in the value of "M." The position of the laser spot 118 along scale 113 is determined by observation, and requires interpolation if the spot is moving due to transient thermal events or other disturbances of the test article.

Figure 8:
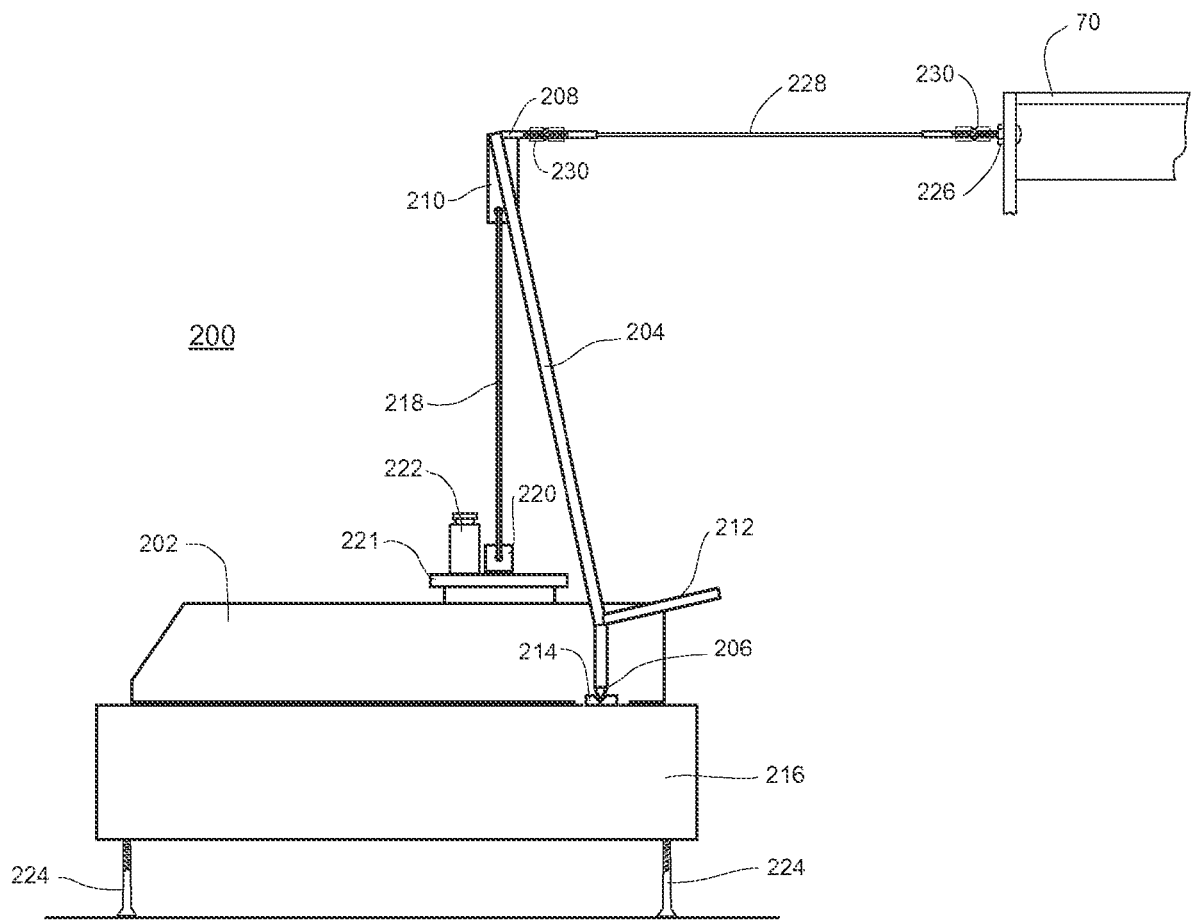
FIG. 8 is a side view of dynamometer test apparatus.

Because this first test apparatus provided repeatable results with great difficulty, a second test apparatus 200 was constructed. Referring to FIG. 8, test apparatus 200 is a dynamometer based upon a laboratory balance 202 (Acculab model V200). The basic balance 202 is accurate to +/-0.01 gram. In order to increase the sensitivity of the test and to transmit a horizontal force into the vertical, a mechanism consisting of a frame 204 in the form of an inverted V having 2 pivot points 206, a cross link attachment point 208, a down link attachment point 210, and two counterweights 212 was constructed. The frame 204 pivot points 206 each rest in a receptacle 214 epoxied into the base 216 that supports the balance 202. A down link 218 connects the down link attachment point 210 to a down link tab 220 epoxied to the weighing platform of the balance 202. The balance 202 and the mechanism as described are mounted on base 216. Four leveling screws 224 allow the base to be leveled with reference to two spirit levels (not shown) and the height of cross link attach point 208 to be placed at the height of cradle attach point 226. The geometry of frame 204 as constrained by the pivot points 214 and the down link 218 results in a vertical force at the balance weighing platform 221 that represents a 10× multiplication of the horizontal force present at cross link attach point 208. To prevent the balance from operating with a negative weight value (an upward force), a bias weight 222 is placed on the weighing platform 221. Two counterweights 212 bias the frame in such a way that down link 218 is always in tension.

Cross link 228 consists of a steel rod with two pointed and threaded ends. One end of cross link 228 is held in a depression in the end of cross link attach point 208 by means of a length of silicon tubing 230 so mounted as to be in tension. Similarly, the other end of cross link 228 is held in a depression in the end of cradle attach point 226 located at the end of cradle 70 bearing the return end of test device 2 by means of a length of silicon tubing 230 so mounted as to be in tension. The tension of silicon tubing 230 ensures that no movement of cradle 70 will change the working distance between cradle attach point 226 and cross link attach point 208.

Tests and calibration of the mechanism described above (e.g., FIGS. 5, 5A, 5B, 5C, and 8) were performed using a 4.54 g test weight 87 suspended by test weight line 88 from a test weight suspension point 89 1.64 meters above its point of contact with test point 91 at the return end outer bowl 52 on propulsion device 2. By moving the point of suspension of this weight horizontally along the center axis 3 axis of the propulsion device 2 in one centimeter increments (multiple test weight suspension points 89, as shown), a horizontal force increasing or diminishing in increments of 27 mg is applied to the propulsion device 2. These calibration tests demonstrate that the balance 202 read out displays movement of cradle 70 toward the impeller end of the test device 2 as a reduction and movement away from the impeller end as an increase in apparent weight with an accuracy and repeatability of +/-1.0 milligrams.

In operation, the balance 202 was turned on and zeroed without bias weight 222 or down link 218 installed. The base 216 was adjusted to be level and at the proper height using leveling screws 224, and the down link 218 and bias weight 222 were installed. The base 216 was then moved away from the cradle 70 in such a manner that 100 to 500 milligrams of tension as measured by balance 202 was placed on cross link 228.

In order to demonstrate the functioning of the test device 2, it was necessary to start a test with the test device 2 in an essentially isothermal state. Typically, this requires at least 12 hours between test runs, preferably 24 hours. The balance 202 digital read out, a digital clock with weekday, hours, minutes, and seconds displayed, digital readouts of the temperature of the impeller end and the return end of heat exchanger 32, and a digital readout of the voltage being supplied to the impeller drive motor 17 are all so arranged as to be photographed by a digital camera. As stated above, the entire test apparatus is enclosed so as to protect the apparatus from stray air currents, and the only attachment to the cradle are the two 24 gauge power leads arranged as a twisted pair which are routed through the top of the enclosure in such a manner as to not restrain the motion of cradle 70 to an external voltage regulator/controller (not shown). No magnetic field of sufficient force as to affect the test results is generated by the power leads or the test device 2.

A test may begin when the balance 202 does not change its digital reading for one minute. A calibration test as described above was performed over a range of 0, +27, +54, +81, +54, +27, and 0 mg. The test protocol is shown in Table 1 below:

TABLE 1

| Time | Action |
|---|---|
| 0:00-1:54 | Power off, photo every 6 seconds |
| 2:00 | Photo, begin power ramp up |
| 2:06-2:54 | Photo every 6 seconds, continue power ramp up |
| 3:00-7:54 | Photo every 6 seconds, full power |
| 8:00 | Photo, begin power ramp down |
| 8:06-8:54 | Photo every 6 seconds, continue power ramp down |
| 9:00 | Photo, power off |
| 9:06-10:00 | Photo every 6 seconds, power off |

This test protocol was designed to investigate the behavior of the test device 2 in a number of ways. The initial balance reading at 0:00 through 2:00 elapsed time establish a rest state value balance read out value prior to the application of power to the test device 2. In the powered segment, the device 2 begins in an isothermal state. Transient start up movements result from the torque required to accelerate the impeller 15 and impeller driver 17, and transient longitudinal movement results from the acceleration of the working mass 4. Both are minimized by ramping up the power over a one minute period (2:00-2:54). Since no propulsive effect should be generated until a temperature gradient is established from the impeller end 34 to the return end 35 of the heat exchanger section 32 of the test device 2, no difference from the rest state balance read out value should be apparent once the initial transient effects outlined above have decayed, thereby ruling out vibration and magnetic effects. As the temperature gradient begins to be established (shown in FIG. 10 by measurement to be in the 2:15 to 2:30 minute elapsed time range), the balance read out value should be reduced by any accelerative force that would accelerate the test device 2 toward the impeller end 34 of the device 2. Ideally, this reduction in the rest state value should be proportional to and coincident with the increase in the temperature gradient, and proportional to and coincident with the velocity of the working mass 4.

As the power is ramped down to zero (8:00-8:54) the balance 202 read out should return to the rest state value, thereby ruling out thermal effects, such as distortion or expansion of the test apparatus. Subsequent values taken at six second intervals should also should remain at the rest state value. The temperature of the impeller and return ends of the heat exchanger will decline somewhat, but a substantial thermal gradient will remain at the 10:00 point. The test run is then followed by a second calibration procedure as described above.

Figure 9:
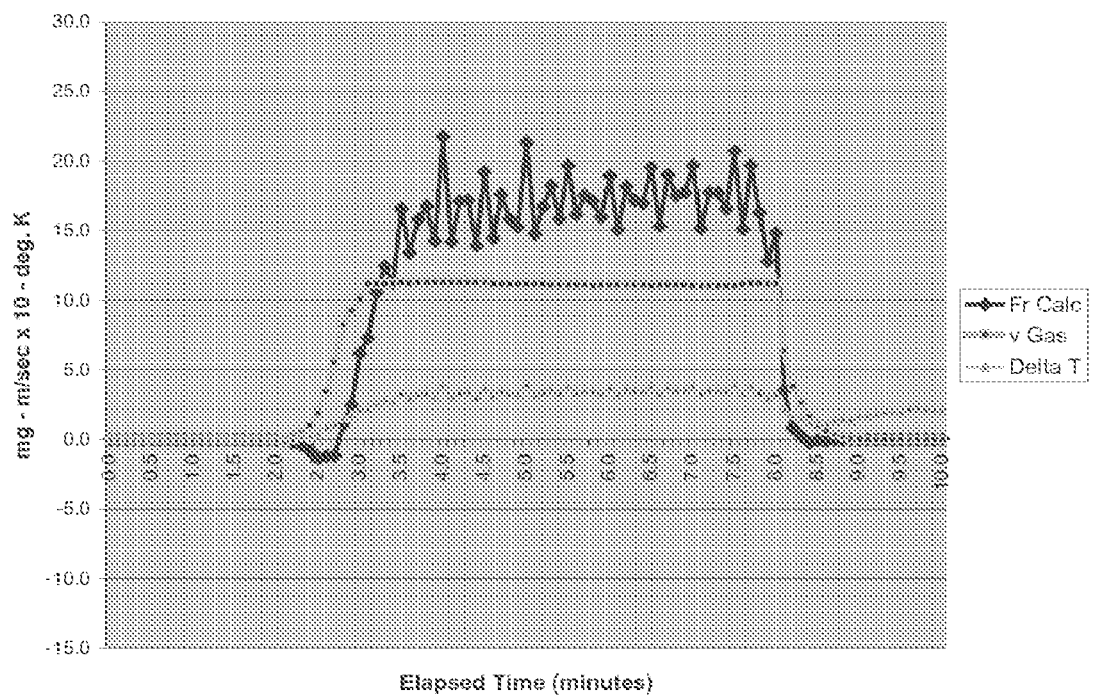
FIG. 9 is a data plot of four consecutive test runs of dynamometer test apparatus (calculated force "Fr Calc," "v Gas" and "Delta T").
Figure 10:
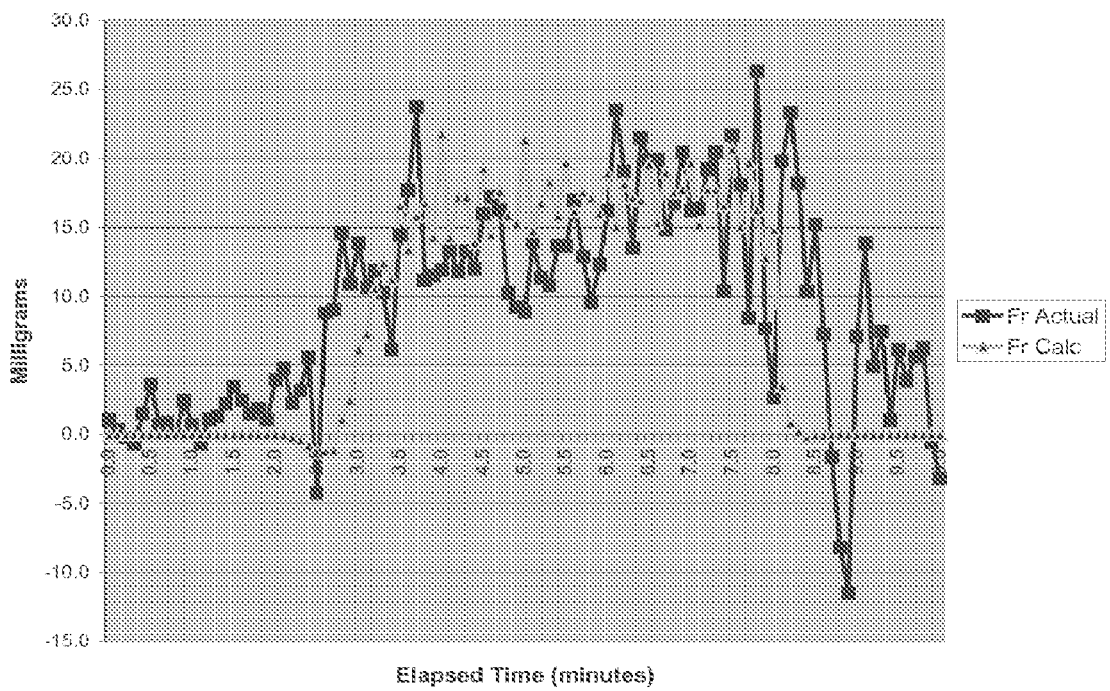
FIG. 10 is a data plot of four consecutive test runs of dynamometer test apparatus (actual force "Fr Actual" and calculated force "Fr Calc").

Referring to FIGS. 9 and 10, data is presented from four test runs of the test device 2 performed to the above protocol on four consecutive days. The force data has been normalized to show the rest value as 0.0 milligrams and inverted so as to show a force acting along the central axis of the test device toward the driver section 31 as an increase.

In FIG. 9 the temperature gradient in degrees Kelvin at each data point represents the average of the four runs at each data point and is here displayed as "Delta T." The average gas velocity at each data point is shown as "v Gas." An expected force value here displayed as "Fr Calc" was calculated using Equation 27 above and the values of $v_1$, $m_1$, $t_1$, $T_1$, and $T_2$ as measured for each data point.

In FIG. 10, the four force measured $F_R$ values from the four test runs were then averaged at each data point and are here displayed as "Fr Actual" with an increase in this value indicating a force acting along the major axis of the device toward the impeller end. The "Fr Calc" values from FIG. 9 are also shown in FIG. 10 for comparison.

The free pendulum period of the test device 2 and cradle 70 was measured to be 2.54 seconds. When restrained by the test apparatus 200 dynamometer, the pendulum period of the test device 2 and cradle was measured to be 1.84 seconds. Oscillations with this period are observed to occur down to the resolution of the test apparatus dynamometer readout, or +/−1.0 mg. In FIG. 10, disturbances attributed to the starting transients of the impeller and its driver having this period are then aliased against the measurement period of 6 seconds, and result in the disturbances not averaged out of the displayed data "Fr Actual" apparent in the 2:00-6:00 minute elapsed time range. That said, there is an unmistakable coupling between the "Fr Actual" value, the velocity of the working mass "v Gas," and the thermal gradient "Delta T." There is also an immediate and appropriate "Fr Actual" response to the cessation of working mass flow "v Gas" following 8:00 elapsed time even though a substantial thermal gradient "Delta T" remains. The immediate reduction apparent in the calculated value of "Fr Calc" in the 8:0-8:54 elapsed time period results in the large transient disturbances in the "Fr Actual" values during the same period. Note that these "Fr Actual" transient disturbances are larger than those seen in the 2:00-6:00 elapsed time period, and that the "Fr Calc" values show the mitigating effect of the slow rise of the thermal gradient "Delta T" in the 2:00-4:00 elapsed time period.

It should be understood that the invention is not limited to the specific test device 2 disclosed above. The particular embodiment was constructed as a test apparatus for reproducibly measuring the thrust of the propulsion device 2 in a laboratory test environment. Other configurations of the propulsion device 2 consistent with the broad concepts disclosed herein are possible. In addition, the following publication entitled "A Propulsion Device for Spacecraft," 05 WAC-27, Society of Automotive Engineers (SAE), 2005 by Joseph M. Brady is incorporated by reference as if set forth fully herein. Thus, while embodiments of the present invention have been shown and described, various modifications may be made without departing from the scope of the present invention. The invention, therefore, should not be limited, except to the following claims, and their equivalents.

What is claimed is:
1. A propulsion device comprising:
an outer housing having a substantially straight section and two curved ends disposed on either side thereof;
an inner housing having a substantially straight section and two curved ends disposed on either side thereof, the inner housing being disposed within and spaced apart from the outer shell to form a plenum containing a gaseous working mass, the inner housing including a return duct connecting the plenum regions formed between the inner housing and the outer housing at the two curved ends thereby forming a sealed plenum between the inner housing and the outer housing, wherein the sealed plenum in the straight section includes a substantially unobstructed duct between the inner housing and the outer housing; and a working mass driver disposed within the plenum for recirculating the gaseous working mass through the plenum, wherein recirculation of the gaseous working mass through the plenum produces a net force in a predetermined direction acting upon the propulsion device.

2. The propulsion device of claim 1, wherein the device is substantially symmetrical in the radial direction.

3. The propulsion device of claim 1, wherein the device exhibits reflective symmetry about a long axis of the device.

4. The propulsion device of claim 1, wherein the working mass driver is disposed within the return duct.

5. The propulsion device of claim 1, wherein the substantially straight section comprises a heat exchanger section.

6. The propulsion device of claim 5, further comprising a cooling system disposed in the heat exchanger section.

7. The propulsion device of claim 1, wherein the device is incorporated into a spacecraft.

8. The propulsion device of claim 1, wherein the device is incorporated into a satellite.

9. The propulsion device of claim 1, further comprising a supplemental heater disposed at least partially within the plenum.

10. The propulsion device of claim 1, wherein the working mass driver is driven by a heat engine.

11. The propulsion device of claim 10, wherein the heat engine includes a nuclear reactor heat source.

12. The propulsion device of claim 10, wherein the heat engine includes a radioisotope heat source.

13. The propulsion device of claim 10, wherein the heat engine includes a solar collector heat source.

14. A method of generating a propulsive force in a device comprising:
providing a device having an outer housing and an inner housing that is disposed within and spaced apart from the outer housing, the inner housing including a return duct connecting opposing ends of the device, the spaced apart housing thereby forming a sealed plenum containing a gaseous working mass therein, the sealed plenum including a heat exchanger section formed by a substantially unobstructed duct formed between the outer housing and the inner housing, the device including a working mass driver positioned within the plenum for recirculating the gaseous working mass through the plenum; and recirculating the gaseous working mass in the plenum using the working mass driver wherein recirculation of the gaseous working mass through the plenum produces a net force in a predetermined direction acting upon the propulsion device.

15. The method of claim 14, further comprising the step of controlling the amount of net force produced by the propulsion device.

16. The method of claim 15, wherein the step of controlling the amount of net force comprises controlling the flow rate of the gaseous working mass within the plenum.

17. The method of claim 15, wherein the step of controlling the amount of net force comprises controlling the degree to which the temperature of the gaseous working mass is reduced.

18. The method of claim 14, further comprising the step of controlling the direction of the net force.

19. A space vehicle including at least one propulsion device, the at least one propulsion device comprising an outer housing and an inner housing that is disposed within and spaced apart from the outer housing, the inner housing including a return duct connecting opposing ends of the propulsion device, the spaced apart housing thereby forming a sealed plenum containing a gaseous working mass therein, the sealed plenum including a heat exchanger section formed by a substantially unobstructed duct formed between the outer housing and the inner housing, the device including a working mass driver positioned within the plenum for recirculating the gaseous working mass through the plenum to produce a net force in a predetermined direction acting upon the at least one propulsion device.

20. The space vehicle of claim 19, wherein the space vehicle comprises a satellite.

* * * * *